US012446995B2

United States Patent
Clunet-Coste et al.

(10) Patent No.: US 12,446,995 B2
(45) Date of Patent: Oct. 21, 2025

(54) DENTAL PREFORM, METHOD FOR MANUFACTURING ONE SUCH PREFORM AND METHOD FOR MANUFACTURING A DENTAL PROSTHESIS FROM ONE SUCH PREFORM

(71) Applicants: Bruno Clunet-Coste, Saint-Etienne-de-Crossey (FR); Bernard Maneuf, Voiron (FR); André Collombin, Voiron (FR)

(72) Inventors: Bruno Clunet-Coste, Saint-Etienne-de-Crossey (FR); Bernard Maneuf, Voiron (FR); André Collombin, Voiron (FR)

( * ) Notice: Subject to any disclaimer, the term of this patent is extended or adjusted under 35 U.S.C. 154(b) by 282 days.

(21) Appl. No.: 17/986,024

(22) Filed: Nov. 14, 2022

(65) Prior Publication Data

US 2023/0157797 A1  May 25, 2023

(30) Foreign Application Priority Data

Nov. 24, 2021  (FR) ...................................... 2112475

(51) Int. Cl.
*A61C 13/00* (2006.01)
*A61C 13/34* (2006.01)
*B29C 53/66* (2006.01)
*B29L 31/00* (2006.01)

(52) U.S. Cl.
CPC .............. *A61C 13/34* (2013.01); *B29C 53/66* (2013.01); *B29L 2031/7536* (2013.01); *Y10T 428/24116* (2015.01)

(58) Field of Classification Search
None
See application file for complete search history.

(56) References Cited

U.S. PATENT DOCUMENTS 5,797,748 A * 8/1998 Reynaud ................ A61C 13/30
433/224
2002/0123023 A1  9/2002 Sicurelli et al.

FOREIGN PATENT DOCUMENTS

| DE | 38 25 601 A1 | 3/1989 |
| EP | 1 147 748 A2 | 10/2001 |
| WO | 96/26687 A1 | 9/1996 |

* cited by examiner

*Primary Examiner* — Jennifer A Boyd
(74) *Attorney, Agent, or Firm* — Oliff PLC

(57) ABSTRACT

A dental preform comprises a central portion formed by a plurality of first wire-like elements extending mostly in a first direction, and a first resin. An annular peripheral portion passes round the central portion perpendicularly to the first direction. The peripheral portion comprises second wire-like elements and a second resin. The peripheral portion comprises a plurality of layers arranged on one another perpendicularly to the first direction. Each layer has at least one turn formed by at least one of the second wire-like elements, the at least one second wire-like element presenting a longitudinal direction that is offset with respect to the first direction by an angle comprised between 10° and 80° or between 100° and 170°. The second wire-like elements of two consecutive layers present opposite orientations.

11 Claims, 2 Drawing Sheets

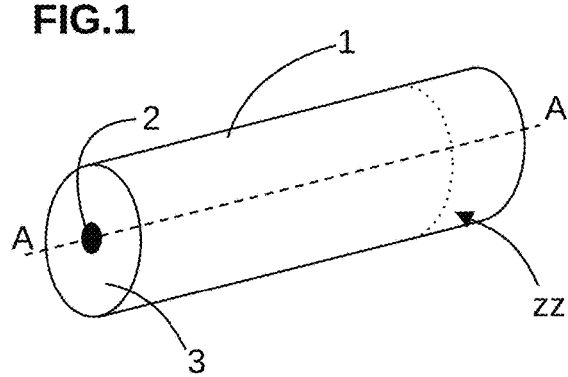
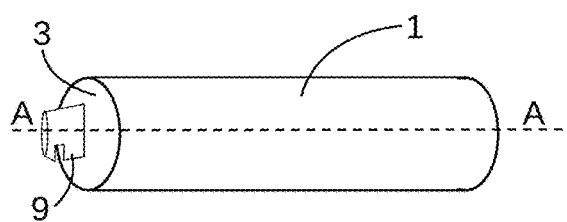
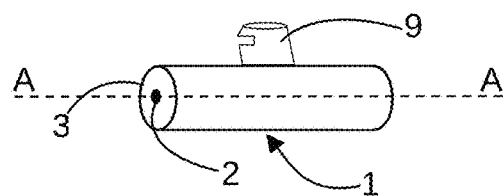
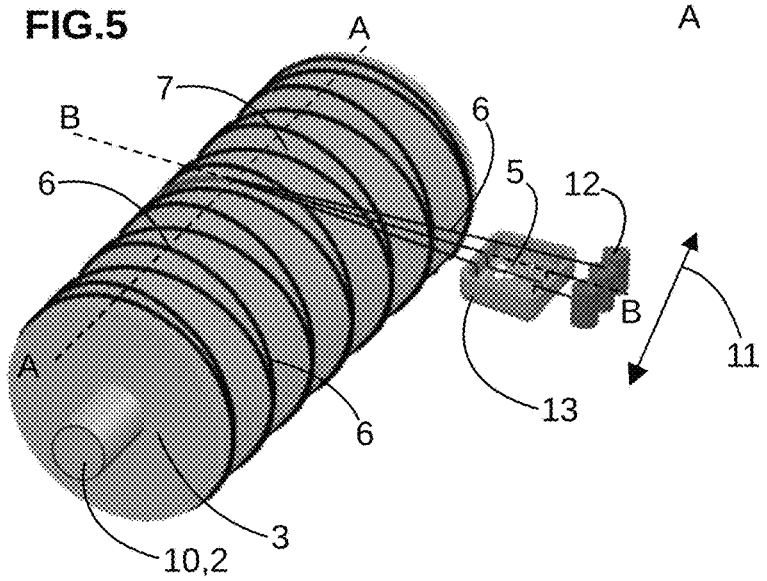
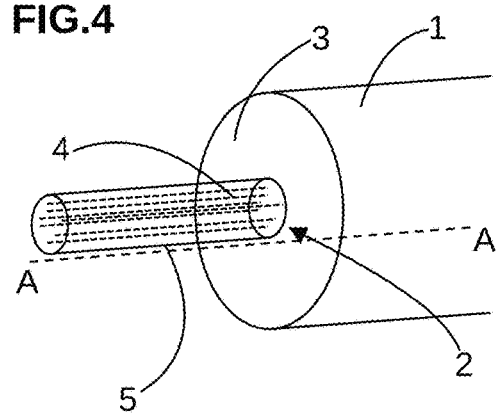

DENTAL PREFORM, METHOD FOR MANUFACTURING ONE SUCH PREFORM AND METHOD FOR MANUFACTURING A DENTAL PROSTHESIS FROM ONE SUCH PREFORM

BACKGROUND OF THE INVENTION

The invention relates to a dental preform, to a method for manufacturing one such dental preform and to a method for manufacturing a dental prosthesis from one such dental preform.

STATE OF THE ART

It is known to form at least a part of a dental prosthesis from a dental preform that is milled. The dental preform is milled by any suitable means and preferentially in CAD-CAM technology. Different types of dental preforms are marketed with substantially homogeneous mechanical characteristics from one end of the preform to the other.

However, it should be noted that the mechanical performances of such preforms are far removed from those of a natural tooth which gives rise to problems of adaptation when a dental prosthesis is installed. It can be observed that current composite materials, in particular particle-based composites, are unsuitable for reproducing the functioning of a natural tooth. The same is the case for ceramic preforms, for example preforms made from lithium disilicate or from zircon. This problem is also present for hybrid ceramics which are composite materials having a main lattice and a secondary lattice. The main lattice made from ceramic is infiltrated by a secondary lattice that is made from polymer. The two lattices are totally imbricated in one another. The ceramic-polymer double lattice structure was designed to ideally conjugate the good properties of ceramic and of composite materials. However, the ceramic main lattice remains rigid and brittle. It is also hardly deformable which does not enable it to reproduce the mechanical performances of a natural tooth. The toughness of this hybrid material is considered to be low thereby limiting its interest.

It is further possible to form a tailor-made dental preform having mechanical performances that have been adapted to match the dimensional constraints of the tooth to be replaced. However, this operation is lengthy and relatively onerous.

A requirement therefore exists to form a dental preform that better corresponds to the mechanical characteristics of a tooth while at the same time being easy to achieve.

SUMMARY OF THE INVENTION

One object of the invention consists in remedying these shortcomings and more particularly in providing a dental preform that has an elastic modulus gradient between its central portion and its peripheral portion in order to better reproduce the mechanical characteristics of a natural tooth.

These shortcomings tend to be overcome by means of a dental preform comprising:
- a central portion formed by a plurality of first wire-like elements and a first resin, the first wire-like elements extending mostly in a first direction, the first resin mechanically bonding the first wire-like elements to one another;
- a peripheral portion in the form of a ring around the central portion perpendicularly to the first direction, the peripheral portion comprising second wire-like elements and a second resin, the second resin mechanically bonding the second wire-like elements to one another, the first wire-like elements and the second wire-like elements being mechanically bonded to one another at least by the first resin and the second resin;
wherein the peripheral portion comprises a plurality of layers arranged on one another perpendicularly to the first direction, the layers passing round the central portion;
wherein each layer has at least one coil formed by at least one of the second wire-like elements, the at least one second wire-like element presenting a longitudinal direction that is offset with respect to the first direction by an angle comprised between 10° and 80° or between 100° and 170°;
wherein the second wire-like elements of two consecutive layers present opposite orientations;
and wherein the second wire-like elements of each layer do not belong to a fabric or to a woven element.

According to one feature of the invention, the central portion has wire-like elements that are predominantly in volume the first wire-like elements.

In preferential manner, the central portion only comprises the first wire-like elements and the first resin.

In a particular embodiment, the peripheral portion has an elastic modulus gradient that is increasing when moving away from the central portion perpendicularly to the first direction.

Advantageously, the peripheral portion presents a second wire-like element content that increases monotonously when moving away from the central portion perpendicularly to the first direction to form the elastic modulus gradient.

In a particular embodiment, the second resin is doped with particles. The peripheral portion presents a ratio of the content of second wire-like elements over the particle content that increases in the radial direction moving away from the central portion perpendicularly to the first direction to form the elastic modulus gradient.

Preferentially, the ratio of the second wire-like element content over the particle content increases in reversely proportional manner to the distance to the central portion to form the elastic modulus gradient.

In another development, at least several layers of the plurality of layers further possess a sheet chosen from a fabric, a woven element, a strip, or a braid, the sheet being situated below or above the second wire-like elements in said several layers.

Advantageously, the sheet extends from one end of the dental preform to the other in the first direction and extends over all the layers, the sheet being in the form of a spiral in a cutting plane perpendicular to the first direction, with an alternation between a thickness of sheet and a thickness of second wire-like element in a direction of observation perpendicular to the first direction and directed from the central portion up to one end of the peripheral portion.

In preferential manner, a plurality of concentric tubes are formed by the sheet of the plurality of layers from the interface with the central portion up to the outer wall of the peripheral portion.

In a preferred embodiment, each layer comprises several second wire-like elements coiled around the central portion.

It is a further object of the invention to provide a manufacturing method that enables a preform to be easily formed presenting mechanical performances that are better mastered. This problem tends to be solved by means of a method for manufacturing a dental preform comprising the following steps:

providing a mandrel extending in a first direction;
forming a peripheral portion in the form of a ring around the mandrel perpendicularly to the first direction, the peripheral portion having a plurality of layers passing round the mandrel, the layers being arranged around one another perpendicularly to the first direction, each layer comprising at least one second wire-like element and a second resin, the second resin mechanically bonding the second wire-like elements to one another in the peripheral portion;
wherein the at least one second wire-like element of each layer presents a longitudinal direction that is offset with respect to the first direction by an angle comprised between 10° and 80° or between 100° and 170°;
wherein the at least one second wire-like element of two consecutive layers presents opposite orientations;
wherein the at least one second wire-like element of each layer does not belong to a fabric or to a woven element;
wherein the mandrel is a central portion formed by a plurality of first wire-like elements and a first resin, the first wire-like elements extending mostly in the first direction, the first resin mechanically bonding the first wire-like elements to one another, the first wire-like elements and the second wire-like elements being bonded to one another at least by the first resin and the second resin, or wherein the mandrel is removed to define an empty area in the peripheral portion, the empty area being filled by a plurality of first wire-like elements and a first resin, the first wire-like elements extending mostly in the first direction, the first wire-like elements and the second wire-like elements being bonded to one another at least by the first resin and the second resin.

Advantageously, two successive layers share the at least one second wire-like element. The turns are formed by a honeycomb coil, and preferentially the at least one second wire-like element extends continuously over all the layers of the peripheral portion.

In preferential manner, each layer further comprises a sheet formed by a fabric or a woven element the weft thread or quasi-weft thread of which extends in the first direction, the sheet extending continuously over the plurality of layers and the sheet being in the form of a spiral in the cutting plane perpendicular to the first direction.

In a preferred embodiment, the method comprises at least cutting of an assembly formed by the central portion and the peripheral portion perpendicularly to the first direction to define the dimension of the dental preform in the first direction.

It is a further object of the invention to provide a method for manufacturing a dental prosthesis the mechanical performances of which are better mastered. This problem tends to be solved by means of a method for manufacturing a dental prosthesis comprising the following steps:
providing a dental preform according to any one of the foregoing configurations;
milling of the dental preform wherein a part of the peripheral portion is completely eliminated to reach the central portion designed to form a root canal anchorage, and another part of the peripheral portion is partially eliminated to form a crown portion of the dental prosthesis according to the predefined shape.

Preferentially, before milling is performed, the method comprises cutting of the dental preform perpendicularly to the first direction to define the dimension of the dental preform in the first direction.

DESCRIPTION OF THE DRAWINGS

Other advantages and features will become more clearly apparent from the following description of particular embodiments and implementation modes of the invention given for non-restrictive example purposes only and represented in the appended drawings, in which:

FIG. 1 schematically illustrates a perspective view of a dental preform;

FIG. 2 schematically illustrates a perspective view of a dental preform fitted on a gripper;

FIG. 3 schematically illustrates another perspective view of a dental preform fitted on a gripper according to another embodiment;

FIG. 4 schematically illustrates a more detailed view of the central portion of a dental preform;

FIG. 5 schematically illustrates a coiling step of the second wire-like element to form the peripheral portion of the dental preform;

DETAILED DESCRIPTION

Figure 6:
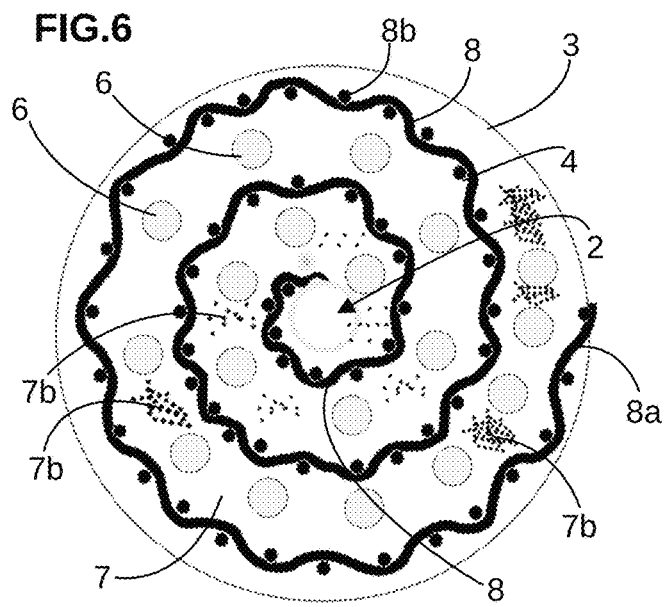
FIG. 6 schematically illustrates a sectional view of a dental preform.

FIGS. 1, 2 and 3 represent a dental preform 1. The dental preform 1 has a central portion 2 and a peripheral portion 3. The dental preform 1 can be a dental preform to be milled or a generic preform that will be cut to form the dental preforms to be milled. The preform is made from composite material with at least one resin and at least one wire-like element.

FIG. 4 illustrates a more detailed view of the dental preform 1 and in particular the central portion 2. The central portion 2 has a plurality of first wire-like elements 4 and a first resin 5. The first wire-like elements 4 extend mostly in a first direction AA. The first resin 5 mechanically bonds the first wire-like elements 4 to one another.

The first wire-like elements 4 have the first wire-like elements 4 oriented mainly in the first direction AA, preferentially parallel to one another. Preferentially, the first wire-like elements 4 extend continuously from one end of the preform to the other in the first direction AA to facilitate transmission of the forces over the height of the central portion 2. The first wire-like elements 4 can comprise unidirectional threads, woven elements, a fabric, a strip, or a braid. It is also possible to combine several of these elements, for example threads and braids. A woven element, a fabric, a strip or a braid can be formed by several threads or fibres.

The threads can be threads made of silica or made from organic material. Preferably, the threads are made from a material chosen from polyethylene, polyether-etherketone PEEK and carbon. The same can be the case for the fibres. In preferential manner, the first wire-like elements 4 extend continuously over the whole height of the dental preform 1, i.e. in the first direction AA.

In preferential manner, the first resin 5 is a polymer resin that is advantageously charged with particles, preferably micro-particles and/or nano-particles. The threads, fibres, fabrics, strips, braids and other elements forming the first wire-like elements 4 can be covered by an impregnating resin. The impregnating resin can be identical to or different from the first resin 5. The impregnating resin and the first resin 5 are chemically compatible to ensure mechanical bonding between the first wire-like elements 4. The resins are preferentially thermoset resins.

The central portion 2 can be of any shape in its cutting plane perpendicular to the first direction AA. Preferably, the central portion 2 presents a circular cross-section.

The central portion 2 has several the first wire-like elements 4 that present a higher elastic modulus than the elastic modulus of the first resin 5 in the first direction AA. The central portion 2 can also present an additional wire-like element that has a lower hardness than the hardness of the first wire-like elements 4 and of the first resin 5 so as to define a preferential etching area thereby facilitating an intervention up to an infected apex.

It is advantageous for the central portion 2 to comprise a majority in volume of the first wire-like elements 4 with respect to any other wire-like element to better channel the forces.

It is advantageous for the central portion 2 to only comprise the first wire-like elements 4 and the first resin 5. The forces applied in the central portion 2 are better channeled.

The peripheral portion 3 completely surrounds the central portion 2 perpendicularly to the first direction AA. The peripheral portion 3 forms a ring the inner part of which is filled by the central portion 2.

The peripheral portion 3 comprises second wire-like elements 6 and a second resin 7. The second resin 7 mechanically bonds the second wire-like elements 6 to one another. The first resin 5 and the second resin 7 mechanically bond the first wire-like elements 4 with the second wire-like elements 6.

The peripheral portion 3 comprises a plurality of layers arranged on one another perpendicularly to the first direction AA from the central portion 2 and preferably up to the outer wall of the dental preform 1. The layers pass right round the central portion 2. In preferential manner, the layers comprise one or more turns of at least one second wire-like element 6 and of the second resin 7 around the central portion 2. The at least one second wire-like element 6 forms at least a full turn around the central portion 2 in an observation in the first direction AA. In a preferred embodiment, a second wire-like element 6 extends continuously from one end of the dental preform 1 to the other in the first direction AA in the form of a spiral making several full turns around the central portion 2. Advantageously, a second wire-like element 6 makes at least two full turns around the central portion 2. Preferentially, the second wire-like element 6 presents a constant or substantially constant winding pitch over the height of the dental preform 1, i.e. in the first direction AA.

The second wire-like element or elements 6 of each layer present a longitudinal direction that is offset with respect to the first direction AA by an angle comprised between 10° and 80° or between 100° and 170°. When a second wire-like element 6 makes a full turn around the central portion 2, it shifts in one direction or another in the first direction AA. In the embodiment illustrated in FIG. 5, the angle made between the longitudinal direction of the second wire-like element 6 during winding (line BB) and the first direction AA is comprised between 10° and 80°. In this configuration, on each turn around the central portion 2, the second wire-like element 6 shifts to the right. In the next layer and in the previous layer, the angle made between the longitudinal direction of the second wire-like element 6 during winding and the first direction AA is comprised between 100° and 170°, which corresponds to a second wire-like element 6 whose longitudinal axis presents an opposite direction to that of the previous layer. On each turn of the central portion 2, the second wire-like element 6 shifts to the left. The coiling direction is opposite between two consecutive layers. The use of the second wire-like elements 6 of two consecutive layers with opposite orientations enables the second wire-like elements 6 of two consecutive layers to define a mesh when observed perpendicularly to the first direction AA.

There is at least one second wire-like element 6 in each layer, for example a thread, a fibre, a strip, or a braid extending from one end of the dental preform 1 to the other in the first direction AA, in the peripheral portion. The at least one second wire-like element 6 forms a plurality of turns around the central portion 2. Depending on the layers, the coils turn in opposite directions around the first direction AA. In preferential manner, in each layer, the second wire-like elements 6 extend continuously from one end of the dental preform 1 to the other in the first direction AA forming turns around the central portion 2.

It is advantageous for the second wire-like elements 6 to form at least five turns around the central portion 2.

The second wire-like element or elements 6 of each layer do not belong to a fabric or to a woven element. The second wire-like element or elements 6 of each layer only define a spiral around the central portion 2. In preferential manner, the second wire-like elements 6 are only joined by the resin in the first direction AA. There is no weft thread or quasi-weft thread as in a woven element to join them to one another.

The second wire-like elements 6 are coiled to form a plurality of turns around the central portion 2. The plurality of turns come in the form of a stack of coiled turns around the central portion 2. The stack of coiled turns comprises several layers of turns arranged on one another in a radial direction perpendicular to the first direction AA.

The second wire-like elements 6 define a plurality of holes that extend up to the central portion 2 in a direction perpendicular to the first direction AA. The holes are filled by the second resin 7. The holes are defined by the multiple layers of superposed coiled turns that are preferentially diamond-shaped when observed perpendicularly to the first direction AA.

The second wire-like elements 6 can comprise a unidirectional thread, a woven element, a fabric, a strip, or a braid. The thread can be a silica thread, a thread made from organic material. Preferably, the thread is made from a material chosen from polyethylene, polyetheretherketone (PEEK) and carbon. The second wire-like elements 6 can have an identical chemical composition to that of the first wire-like elements 4 or a different chemical composition from the latter.

In preferential manner, the second resin 7 is a polymer resin that is charged by particles 7a, preferably microparticles and/or nano-particles. The threads, fibres, fabrics, strips, braids and other elements forming the second wire-like elements can be covered with a second impregnating resin. The second impregnating resin can be identical to or different from the second resin 7. The second impregnating resin and the second resin 7 are chemically compatible to ensure mechanical bonding between the second wire-like elements 6. The resins are preferentially thermoset resins.

Formation of several annular layers arranged around one another and mechanically connected to one another by the second resin 7 enables the mechanical performances to be efficiently adjusted in radial or substantially radial manner perpendicularly to the first direction AA. As the thickness of a second wire-like element is small, it is possible to make a large number of turns around the central portion 2 to form the peripheral portion 3 while remaining within the lateral dimensions of a tooth to be repaired. It is therefore possible to easily fabricate a dental preform 1 whose mechanical performances are radially mastered, i.e. according to the distance at which it is located with respect to the central portion 2.

Modulation of the coiling characteristics in each layer from the interface with the central portion 2 up to the outer wall of the peripheral portion 3 provides a great freedom in modulation of the mechanical characteristics in radial or substantially radial manner.

Each layer is formed at least by one or more the second wire-like elements 6 that are coiled around the central portion 2 and on the bottom layer if applicable. The coiled winding present in each layer is defined at least by the following technical characteristics:
- the number of the second wire-like elements 6 coiled in a layer;
- the intrinsic technical characteristics of the second wire-like element or elements 6 used with for example the elastic modulus, the cross-section, the chemical composition, and the surface state;
- the coiling tension of each coiled wire-like element;
- the winding pitch, i.e. the offset in the first direction AA when a full turn is made which is equivalent to the angle existing between the first direction AA and the longitudinal axis of the second wire-like element;
- the use or not of an impregnating resin and the composition of the impregnating resin, if the latter is present, for each wire-like element.

The mechanical characteristics of a layer are dependent on the coiling characteristics and on the composition of the second resin 7 in said layer.

In order to form a dental preform 1 presenting mechanical characteristics close to those of a natural tooth, it is advantageous to form a peripheral portion 3 that has an elastic modulus gradient in a direction perpendicular to the first direction AA. The elastic modulus is increasing in the peripheral portion 3 starting from the interface with the central portion 2 and moving away from the central portion 2. The elastic modulus is advantageously the elastic modulus in the first direction AA and/or in the direction perpendicular to the first direction AA.

In preferential manner, the elastic modulus gradient in the peripheral portion 3 is increasing monotonously from the interface with the central portion 2 up to at least 50% of the thickness of the peripheral portion 3 and even more preferentially over at least 75% of the thickness or even over the whole thickness of the peripheral portion 3. In even more preferential manner, the elastic modulus gradient in the peripheral portion 3 is linearly increasing from the interface with the central portion 2 up to at least 50% of the thickness of the peripheral portion and even more preferentially over at least 75% of the thickness or even over the whole thickness of the peripheral portion 3.

In an advantageous embodiment, at the outer end of the peripheral portion 3, the elastic modulus is more than 80 GPa and it is less than 20 Gpa in immediate proximity to or in the central portion 2. In preferential manner, the elastic modulus gradient extends over at least 40 GPa.

To reduce the propagation of micro-cracks from the outer surface of the dental preform 1 in the direction of the central portion 2, it is advantageous to make the value of the elastic modulus decrease progressively in the direction of the central portion 2, preferably over at least 40 GPa and even more preferentially in linearly decreasing manner.

To obtain an elastic modulus gradient over several layers, the coiling characteristics are modified from one layer to the other or from one set of layers to the other.

The elastic modulus gradient can be obtained by modifying at least one of the following parameters:
- the number of second wire-like elements in the layer,
- the value of the winding pitch,
- the chemical composition in the second resin 7,
- the coiling tension of second wire-like element 6,
- the cross-section and/or the chemical composition of the wire-like element or elements forming the second wire-like element 6,
- the surface state of the second wire-like element 6.

Modification of the chemical composition of the second resin 7 or of the second impregnating resin can be a modification of the charge content, for example the microparticle content, the nanoparticle content, or the whisker content. Modification of the chemical composition can be a modification of the chemical composition of the charges. The modifications made on the second resin 7 have the effect of modifying its mechanical characteristics in the direction perpendicular to the first direction AA and in the first direction. For example, to increase the value of the elastic modulus when moving away from the central portion 2, it is possible to progressively increase the charge content (the other parameters not having changed) in the layers when moving away from the central portion 2. It is also possible to modify several parameters between two successive layers, for example the winding pitch and charge content.

In one embodiment, a layer is formed by several turns originating from the same thread wound around the central portion 2. In an alternative embodiment, several different threads are wound around the central portion 2. The threads of one and the same layer can be identical in cross-section and in composition. It is also possible to provide threads having the same composition and different cross-sections so as to use threads having different mechanical performances. It is further possible to use threads having different compositions with identical or different cross-sections to form a layer with threads having different mechanical performances. When the layers are formed by threads having different mechanical performances, modification of the proportion of threads between two layers makes it possible to modify the value of the elastic modulus between two layers, the other parameters being unchanged. It is naturally possible to modify this parameter and at least another chosen from the winding pitch and the composition of the second resin 7.

In a particular embodiment, in addition to the second wire-like element or elements 6 and the second resin 7, at least one layer has a sheet 8 that passes round the central portion 2. The sheet 8 can be a fabric or a woven element, a strip or a braid. The fabric has weft threads 8b and warp threads 8a. The woven element differs from the fabric in that it does not have any weft threads. Quasi-weft threads oriented like the weft thread of a fabric do exist, but they are mechanically distinct. The quasi-weft threads do not join up.

It is particularly advantageous to use the sheets 8 and in particular the sheets 8 that have threads or wire-like elements oriented in parallel manner to the first direction AA. When the dental preform 1 is used to form a prosthetic element of inlay-core type, the threads or wire-like elements oriented in the first direction AA enhance the transfer of forces according to the height of the prosthetic element, i.e. according to the direction connecting the root apex to the apex of the crown part. The threads or wire-like elements improve the mechanical strength and toughness characteristics in the presence of chewing forces. Such a gain is observed for forces in the first direction AA or with an angular offset equal to 45°.

In this particular case, it is advantageous to form a preform the maximum dimension of which perpendicular to the first direction AA, for example a diameter, is less than 40 mm. The arrangement of wire-like elements in the central portion 2 and in the peripheral portion 3 and possibly the diameter of the preform can be chosen according to the tooth to be replaced, for example its dimensions, its position in the mouth and the characteristics of the adjacent teeth.

It is also possible to form dental preforms of larger size in the direction perpendicular to the first direction AA and even more preferentially in the first direction AA. The preform can have a diameter of more than 5 cm, advantageously more than 10 cm and even more advantageously more than 20 cm. The thickness in the first direction AA is advantageously greater than 1 cm, more advantageously greater than 2 cm and even more advantageously greater than 3 cm. The dental preforms can then be used to form infrastructures of adjoined or conjoint dento-supported prostheses, or even of implants.

In preferential manner, the sheet 8 is a fabric or a woven element the weft thread or quasi-weft thread of which is oriented mainly in a direction parallel to the first direction and the warp threads of which are arranged perpendicularly to the first direction AA.

The sheet 8 is wider than the second wire-like element 6 in the first direction AA, preferably slightly wider than the second wire-like element 6 to remain fully compatible with the winding pitch. Preferentially, when several second wire-like elements are used in the same layer, the sheet 8 extends over slightly more than the width occupied by the second wire-like elements 6. The use of the sheet 8 does not modify the coiling characteristics.

In preferential manner, coiling of the sheet 8 is performed so as to have an overlap of the ends of the coil turns in the first direction AA. The sheet 8 then forms a tube right round the central portion 2 over the whole height of the dental preform 1.

The second wire-like element or elements 6 are arranged between two consecutive sheets 8. Two turns of two consecutive layers are separated by a sheet 8.

It is advantageous for the sheet 8 to extend continuously over several successive layers. In other words, the sheet 8 forms several concentric tubes around the central portion 2. Connection between the tubes is made at the two opposite ends of the preform in the first direction AA in alternate manner between the top end and the bottom end or the right and left. In a particular embodiment, the sheet 8 extends continuously over all the layers of the peripheral portion 3.

The sheet 8 can form several full turns around the central portion 2, for example two full turns, five full turns or more than ten full turns. The number of full turns can be defined by the final diameter required for the dental preform.

Depending on the embodiments, when coiling is performed, the sheet 8 is deposited systematically below or above at least one second wire-like element 6 of the layer.

When observed in a cutting plane perpendicular to the first direction AA, as illustrated in FIG. 6, the sheet 8 extends continuously over several layers and appears in the form of a spiral. The use of a sheet in the form of a spiral extending over several layers and preferentially over all the layers enables a good transmission of forces to be had between the outer part of the preform and its central portion. Such a configuration enables the preform to come close to the mechanical functioning of a natural tooth.

The coiled arrangement of the sheets and of the second wire-like elements 6 introduces a clamping effect enabling very strong wire-like elements to be formed. The spiral arrangement also enhances the toughness of the dental preform thereby facilitating the prevention of microcracks.

The spiral arrangement enables wire-like elements of great length to be installed in a preform of small size. The length of the wire-like element, for example a warp thread or a second wire-like element, can be at least five times the height of the preform, preferably at least 10 times the height, or at least 20 times the height. The length of the wire-like element, for example a warp thread or a second wire-like element, can be at least five times the diameter of the preform, preferably at least 10 times the diameter, or at least 20 times the diameter. The use of very long wire-like elements gives the preform a better mechanical strength.

The dental preform 1 formed can be a preform to be milled or a preform to be cut.

When a preform to be milled is fabricated, i.e. a preform to be milled without going through a prior step of cutting perpendicularly to the first direction, it is advantageous for the preform to be of small size, for example with diameter of less than 50 mm. The preform presents a volume that is of the same order of magnitude as that of a tooth. A gripper 9 is fixed to the preform to facilitate milling as illustrated in FIG. 1. Milling of the preform preferentially defines an inlay-core advantageously by a milling technique called CAD-CAM milling. The dental preform can also form a crown and root reconstruction. The preform is then covered by a crown that can be made from ceramic or from composite material and preferentially from zircon. It is further possible to use the dental preform to form an implant abutment. The mechanical configuration of the preform is particularly advantageous to withstand the chewing forces which are multidirectional. It is also possible to form wider preforms, but this gives rise to fabrication problems and to problems of keeping the layers on one another. Wider preforms can form bridge infrastructures, for example on natural or implant teeth.

When a preform to be milled is formed, the preform has to cut once or several times perpendicularly to the first direction AA in order to define a plurality of elementary preforms which will form the preforms to be milled. It is advantageous to form a preform that is higher in the first direction AA so as to be able to form several preforms to be milled. It is also advantageous to form wider preforms to adapt the preform to other uses than inlay-core formation, for example bridge infrastructures, for example on natural or implant teeth. The cutting step enables the height of the preform to be adjusted according to requirements. To form a preform of large width easily, it is preferable to form a preform of large height which facilitates securing of the second wire-like elements and sheets to one another on the multiple layers.

The preform is more deformable than an equivalent made from metal and for example supports made from shape-memory metals. The deformability of the preform is defined by means of the mechanical performances of the different layers. A preform with large dimensions and an elastic modulus gradient enables the performances of the preform to be better adapted to the stresses of the dental arches. The preform can have a circular or oval cross-section or a shape close to the latter to better match the shape of the dental arches thereby enhancing matching of the mechanical properties.

The dental preform to be milled directly is milled in order to form a dental prosthesis of inlay-core type with a root canal area and a crown area. The root canal area is designed to be inserted in the canal of the dental root, for example of a laboratory model. The crown area is designed to form the crown part of the tooth destroyed by tooth decay, for example to support a peripheral prosthetic cap. The dental preform is milled so that the central portion sinks into the dental canal and extends into the crown part. A part of the peripheral portion 3 is completely eliminated to form the root canal part. The peripheral portion is milled and partly preserved so as to form the crown part which will simulate the dentine of a natural tooth. The peripheral portion is milled so as to define a shape that is close to the shape of the dentine to be replaced.

The dental preform 1 is milled by means of any suitable milling machine, preferably a computer-assisted milling machine for example with 3 axes to 5 axes. The dental preform 1 is milled in order to reproduce a predefined shape that is calculated at least from the imprint of the tooth to be repaired.

FIGS. 2 and 3 represent two embodiments where the dental preform 1 has a gripper 9. In the embodiment of FIG. 2, the gripper 9 is fixed to the outer side wall of the peripheral portion 3. In the embodiment of FIG. 2, the gripper 9 is fixed to an end surface, i.e. a surface onto which the first wire-like elements 4 open out.

Formation of several concentric layers, preferentially with turns obtained by winding and advantageously by honeycomb winding, makes it possible to define more precisely the mechanical performances of the peripheral portion 3 for each layer and therefore the modification of the characteristics according to the distance from the central portion 2.

This embodiment enables a dental preform to be formed with mechanical characteristics that are substantially identical all around the central portion depending on the value of the radius. It is then possible to define the expected technical characteristics according to the coiling characteristics of the layer which includes the composition of the resin used in the layer.

The dental preform 1 can be formed in different ways. The peripheral portion 3 is formed on a mandrel 10. In one embodiment, the mandrel 10 is formed by the central portion 2, i.e. the assembly formed by the first wire-like elements 4 and the first resin 5.

In another embodiment, the mandrel 10 is another element, i.e. an element that does not form part of the dental preform 1, for example a metal mandrel. The peripheral portion 3 is formed around the mandrel 10. The mandrel 10 is then eliminated forming a hole in the peripheral portion 3. The hole is then filled by the first resin 5 and the first wire-like elements 4 to form the previously defined the central portion 2. This embodiment is particularly well-suited for forming a preform to be cut.

The mandrel 10 extends in the first direction AA. In one embodiment, the mandrel 10 rotates around the first direction AA which passes through the mandrel 10. In another embodiment, the second wire-like elements 6 rotate around the mandrel 10.

The peripheral portion 3 is formed around the mandrel 10 forming a plurality of layers on one another. The peripheral portion 3 is in the form of a ring around the central portion 2 in a cutting plane perpendicular to the first direction AA. The peripheral portion 3 is formed by depositing one or more the second wire-like elements 6 that surround the mandrel 10 and by depositing the second resin 7. The second resin 7 mechanically bonds the second wire-like elements 6 to one another.

The second wire-like element or elements 6 define a plurality of layers arranged on one another perpendicularly to the first direction AA. The layers pass round the mandrel 10.

The second wire-like elements 6 are coiled to define the different layers of the peripheral portion 3. The second wire-like elements 6 of each layer present a longitudinal direction that is offset with respect to the first direction by an angle comprised between 10° and 80° or between 100° and 170°. The coiling is performed with a certain angular offset with respect to the first direction AA and with respect to the perpendicular to the first direction AA. The second wire-like elements 6 are preferentially wound from one end of the mandrel 10 to the other.

Formation of the peripheral portion 3 is performed so that two consecutive layers present the second wire-like elements 6 having opposite orientations. The second wire-like elements 6 of two consecutive layers define a meshing when observed perpendicularly to the first direction AA. In this way, if in a first layer winding of the second wire-like elements is performed "rising" or "dextro-rotatory", winding of the immediately consecutive lower and upper layers is performed "descending" or "levo-rotatory" and vice versa.

When formation of the peripheral portion 3 takes place, the second wire-like elements 3 of each layer do not belong to a fabric or to a woven element.

In order to form the peripheral portion 3 efficiently, it is particularly advantageous to perform honeycomb winding of the second wire-like element or elements 6 on the mandrel 10. In a honeycomb winding, one or more the second wire-like elements 6 are wound round the mandrel 10 in continuous manner. The second wire-like element or elements 6 are provided by an arm 11 that moves in one direction from a first stop until it reaches a second stop. Once the second stop has been reached, the arm 11 moves in the other direction. Movement of the arm 11 is linked to rotation of the mandrel 10 on itself or to rotation of the arm around the mandrel 10, but this second embodiment is less advantageous as it is more difficult to implement. Performing honeycomb winding is known as such and has been used to form electric inductances.

Honeycomb winding is particularly advantageous as it enables the turns of each layer and more particularly turns in opposite directions for two consecutive layers, to be formed quickly and in controlled manner. The position of the second wire-like elements is defined by the position of movable the arm 11 thereby enabling the wire-like elements to be placed on one another in reproducible manner when the winding pitch is constant between two layers in the same direction.

Such a winding mode enables easy modification of the tension in the second wire-like elements 6 when coiling is performed. Such an embodiment also enables the relationship between movement of the arm 11 and rotation of the mandrel 10 to be easily modified.

The thickness of second wire-like elements 6 being known, it is possible to know the thickness of a layer. If relevant, the thickness of the sheet 8 is also known. To modify the mechanical characteristics of the peripheral portion 3 according to its distance with respect to the axis of rotation of the mandrel 10 or to the outer surface of the mandrel, it is possible to count the number of turns made and to estimate the corresponding thickness.

Winding conditions are defined for each turn of the dental preform 1 and the dental preform 1 is formed by winding the second wire-like elements 6 according to the winding conditions, i.e. by imposing the winding characteristics, the composition of the second wire-like elements 6, the composition of the second resin 7 and the composition of the impregnating resin if applicable.

FIG. 5 illustrates a particular embodiment of the configuration described above with a mandrel 10 mounted rotating around the first direction AA. Several the second wire-like elements 6 are provided and pass through a spinneret 12 mounted on a movable the arm 11. Rotation of the mandrel 10 results in movement of the arm 11 and of spinnerets 12 in a back-and-forth movement in a direction parallel to the first direction AA. The value of the movement of the arm 11 when one turn of the mandrel 10 is performed defines the value of the angle that exists between direction AA and the longitudinal axis of the second wire-like elements 6.

The second wire-like elements 6 pass through an impregnation tank 13 that contains an impregnating resin or second resin 5. By modifying the composition of the resin in the impregnation tank 13, the composition of the resin can be modified according to the number of layers deposited, i.e. the number of turns of the mandrel 10 from the interface with the mandrel 10. This modification enables the elastic modulus gradient to be defined. In preferential manner, the impregnation tank provides the second resin 7. It is possible to adjust the impregnation rate of the at least second wire-like element which enables the thickness of the layer to be at least partially defined.

In the embodiment illustrated in FIG. 5, three elementary second wire-like elements are provided and join up to form a single second wire-like element 6. By modulating the number of elementary wire-like elements passing through the impregnation tank 13, it is possible to adjust the quantity of the second resin 7 that is deposited.

In an alternative embodiment, the arm 11 only moves the second wire-like element 6 or the impregnation tank 13 in order to move the second wire-like element 6 to form the turns.

Figure 7:
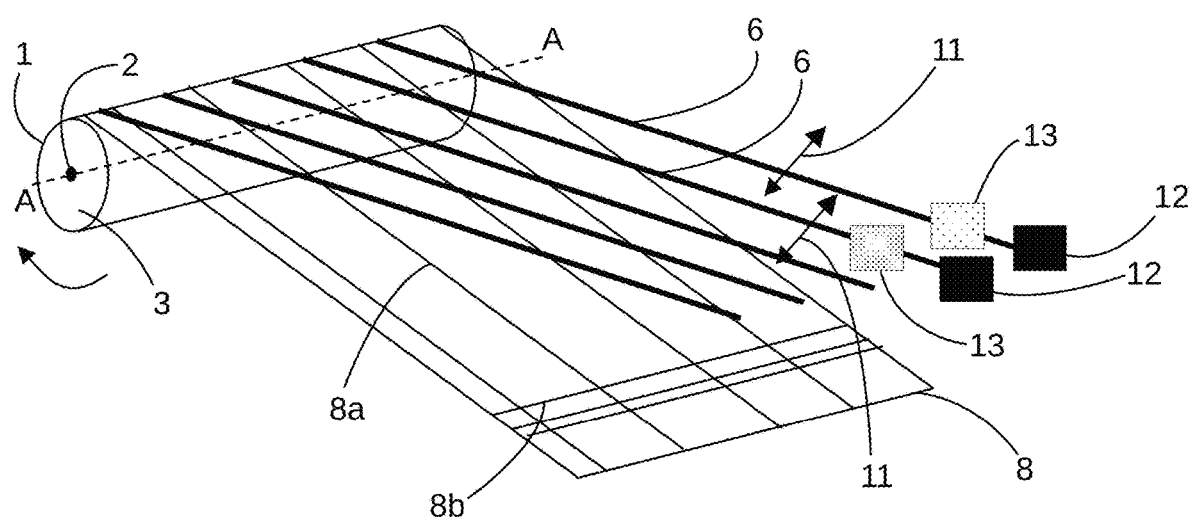
FIG. 7 schematically illustrates a view of a device for manufacturing a dental preform.

In an alternative embodiment illustrated in FIG. 7, each thread is associated with a specific impregnation tank 13.

FIG. 7 illustrates an embodiment close to that of FIG. 5 where four wire-like elements 6 are coiled round the mandrel 10. For the sake of clarity, only two wire-like elements 6 pass through a spinneret 12 mounted on a movable the arm 11. Movement of the arm 11 in a back-and-forth movement is linked to rotation of the mandrel 10 as before.

The two wire-like elements 6 pass through two different the impregnation tanks 13 thereby enabling the resin associated with each of wire-like elements 6 to be modified independently according to the number of turns of the mandrel 10 made.

FIG. 7 also illustrates the coiling of a sheet 8 around the mandrel 10. The sheet 8 and the second wire-like elements 6 are wound in the same direction. The sheet 8 extends over the whole height of the dental preform 1 or over more than the height of the dental preform 1 to form for example over the whole active length of the mandrel 10 in the first direction AA.

The sheet 8 is wound without a winding pitch in the first direction AA or with a winding pitch compatible with a total overlap of the height of the dental preform 1 at each turn. In this embodiment, it is advantageous to use several the second wire-like elements 6 that are distributed over the width of the sheet 8, preferably uniformly distributed over the width of the sheet 8. Each of the second wire-like elements 6 forms turns around the central portion 2, each of the turns extending from one end of the future the dental preform 1 to the other in the first direction AA. The turns are offset from one another in the first direction AA and can extend beyond the height of preform 1.

When several the second wire-like elements 6 are used in a layer, it is advantageous to associate a specific impregnation tank for each second wire-like element so as to be able to dissociate the composition of the associated second resin thereby better controlling the variations of the mechanical characteristics in the radial direction.

When several the second wire-like elements 6 are used in a layer, it is advantageous to use an independent the arm 11 for each second wire-like element 6 so as to be able to dissociate the winding pitch thereby better controlling the variations of the mechanical characteristics in the radial direction.

Once the dental preform 1 has been totally wound, it is advantageous to perform polymerisation of the second resin 7 and of second impregnating resin if applicable.

In preferential manner, the coiled and polymerised the dental preform 1 presents a circular cross-section. The mechanical characteristics of the peripheral portion 3 are modified depending on the distance with respect to the centre of the dental preform 1 perpendicularly to the first direction AA.

In a particular embodiment, the dental preform 1 is provided and a cutting step is then performed so as to define a plurality of elementary preforms from the initial preform. The cutting plane ZZ is preferentially perpendicular to the first direction AA. It is then possible to form an elementary preform with the chosen height (the dimension in the first direction AA) according to requirements.

As the dental preform 1 or the elementary dental preform is designed to be milled to form a dental prosthesis element, the dimension in the first direction AA is preferentially comprised between 10 mm and 60 mm according to the prosthetic element to be formed.

It is advantageous for the dental preform 1 not to have any wire-like element that extends mainly perpendicularly or perpendicularly to the first direction AA and that is common to the central portion 2 and to the peripheral portion 3. The dental preform 1 is devoid of any wire-like element passing through the first wire-like elements 4 and between the turns of the second wire-like elements 6.

It is advantageous for the dental preform 1 not to have any wire-like element that extends perpendicularly to the first direction AA and in radial manner in the peripheral portion 3.

It is advantageous for the preform not to have any wire-like element that extends perpendicularly to the first direction AA and in radial manner in the central portion 2.

When the cutting operations perpendicularly to the first direction AA or the milling operations are performed, the end areas of the dental preform 1 are eliminated. The terminal turns that connect a layer with the consecutive layer going outwards or inwards are eliminated. These mechanical connection areas between the turns originate from a honeycomb winding. Elimination of the terminal turns means that the turns are only mechanically connected by means of the second resin 7. Without this the second resin 7, the turns are mechanically dissociated from one another.

In preferential manner, the dental preform 1 presents itself in the form of a disc with a constant circular cross-section from one end of the preform to the other in the first direction. As an alternative, the cross-section can be a circle with a flat spot. Other shapes are possible with a constant cross-section from one end of the dental preform 1 to the other in the first direction AA. The dental preform is designed to form a dental prosthesis for installation preferably on a laboratory model.

The invention claimed is:

1. Dental preform comprising:
   a central portion formed by a plurality of first wire-like elements and a first resin, the first wire-like elements extending mostly in a first direction, the first resin mechanically bonding the first wire-like elements to one another;
   a peripheral portion in the form of a ring around the central portion perpendicularly to the first direction, the peripheral portion comprising second wire-like elements and a second resin, the second resin mechanically bonding the second wire-like elements to one another, the first wire-like elements and the second wire-like elements being mechanically bonded to one another at least by the first resin and the second resin;
   wherein the peripheral portion comprises a plurality of layers arranged on one another perpendicularly to the first direction, the layers passing round the central portion;
   wherein each layer has at least one turn formed by at least one of the second wire-like elements, the at least one second wire-like element presenting a longitudinal direction that is offset with respect to the first direction by an angle comprised between 10° and 80° or between 100° and 170°;
   wherein the second wire-like elements of two consecutive layers present opposite orientations;
   wherein the second wire-like elements of each layer do not belong to a fabric or to a woven element;
   wherein at least several layers of the plurality of layers further have a sheet chosen from a fabric, a woven element, a strip or a braid, the sheet being situated below or above the second wire-like elements in said several layers; and
   wherein the sheet extends from one end of the dental preform to the other in the first direction and extends over all the layers, the sheet being in the form of a spiral in a cutting plane perpendicular to the first direction, with an alternation between a thickness of sheet and a thickness of second wire-like element in a direction of observation perpendicular to the first direction and directed from the central portion up to one end of the peripheral portion.

2. Dental preform according to claim 1 wherein the central portion has wire-like elements that are predominantly in volume the first wire-like elements.

3. Dental preform according to claim 2 wherein the central portion only comprises the first wire-like elements and the first resin.

4. Dental preform according to claim 1, wherein the peripheral portion has an increasing elastic modulus gradient when moving away from the central portion perpendicularly to the first direction.

5. Dental preform according to claim 4, wherein the peripheral portion presents a content of second wire-like elements that is increasing monotonously when moving away from the central portion perpendicularly to the first direction to form the elastic modulus gradient.

6. Dental preform according to claim 4, wherein the second resin is doped with particles and wherein the peripheral portion presents a ratio of the second wire-like element content over the particle content that is increasing in the radial direction when moving away from the central portion perpendicularly to the first direction to form the elastic modulus gradient.

7. Dental preform according to claim 6, wherein the ratio of the second wire-like element content over the particle content increases in inversely proportional manner to the distance from the central portion to form the elastic modulus gradient.

8. Dental preform according to claim 1, wherein a plurality of concentric tubes is formed by the sheet of the plurality of layers from the interface with the central portion up to the outer wall of the peripheral portion.

9. Dental preform according to claim 1 wherein each layer comprises several second wire-like elements coiled around the central portion.

10. Method for manufacturing a dental prosthesis comprising the following steps:
    providing a dental preform according to any claim 1;
    milling of the dental preform wherein a part of the peripheral portion is completely eliminated to reach the central portion designed to form a root canal anchorage, and another part of the peripheral portion is partially eliminated to form a crown portion of the dental prosthesis according to a predefined shape.

11. Method for manufacturing a dental prosthesis according to claim 10 comprising, before milling is performed, cutting of the dental preform perpendicularly to the first direction to define the dimension of the dental preform in the first direction.

* * * * *